Jan. 22, 1963

R. LOOKER 3,074,136

WEB END CONNECTORS

Filed Oct. 12, 1960

INVENTOR:
Robert Looker

By Smyth, Roston & Pavitt
Attorneys

United States Patent Office 3,074,136
Patented Jan. 22, 1963

3,074,136
WEB END CONNECTORS
Robert Looker, Santa Monica, Calif., assignor to Brown-Line Corporation, El Segundo, Calif., a corporation of California
Filed Oct. 12, 1960, Ser. No. 62,285
7 Claims. (Cl. 24—165)

This invention relates to a strap connector for releasable engagement with a companion loop element, and more particularly, relates to a connector in the form of a hook means for cooperation with a loop element with either the hook means or the loop element mounted on a strap end or with both mounted on corresponding strap ends.

While the invention is broadly applicable for its purpose, it has been initially embodied in a strap connector for tying down cargo in aircraft. This particular embodiment of the invention is described herein by way of example and will provide adequate guidance for those skilled in the art who may have occasion to apply the same principles for other specific purposes. For example, the teachings of the invention may be readily applied to parachute snaps.

It is an old practice to provide hook means on the end of a cargo strap to engage a companion loop element such as a ring. In many instances some type of retainer is provided to keep the hook means from becoming disengaged from the companion loop element. Such a retainer is pivotally mounted to swing between an open position and a closed position and is urged to its closed position by a suitable spring, for example a torque spring. At its normal closed position the retainer blocks the path of disengagement of the loop element from the hook means.

In constructing a cargo strap connector for aircraft use, three requirements must be kept in mind. In the first place, the connector must have adequate strength to carry any load that may be imposed on it. In the second place, it should be of minimum weight. In the third place, it should be economical in cost.

The importance of the weight of such a strap connector may be understood when it is considered that the cost of carrying the cargo straps and fittings in a jet airplane in active service is estimated to be $16.00 per pound per month.

The present invention reduces the weight of a hook connector for carrying a given strap load and does so in an economical manner, without any extra cost involved in the construction of the hook connector.

The invention serves its purpose by employing a retainer which not only has the usual function of keeping the hook means in engagement with the loop element to prevent accidental disengagement but also, and more important, has the function of reinforcing the hook means. The retainer extends across the path of deflection under load of the hook means to the imposed load to brace the hook means and thus share a substantial portion of the total applied load. Thus the invention provides a retainer which, unlike conventional retainers on hooks, is capable of carrying a substantial load in tension and is so constructed and arranged as to hook around the hook means. By extending across the path of yield of the hook means, the retainer takes over a substantial portion of the load automatically in response to the initial yielding action or deflection of the hook means, as the load is applied.

Since the metal employed in the fabrication of the connector can carry a much higher load in tension than a load under bending stress, a relatively light retainer can carry a relatively heavy load. It is for this reason that the total weight of a combined hook means and retainer required to carry a given load may be substantially less than the weight of a hook means strong enough to carry the same load.

The features and advantages of the invention may be understood by reference to the following detailed description and the accompanying drawing.

In the drawing, which is to be regarded as merely illustrative:

Figure 1:
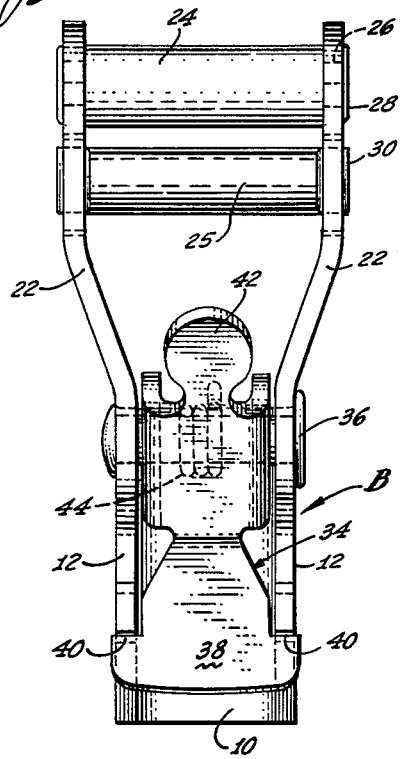
FIG. 1 is a plan view of a selected embodiment of the strap connector.

The illustrated embodiment of the invention has a channel-shaped body, generally designated B, with a central web 10 and two opposite side flanges 12. The two side flanges 12 provide the hook means of the strap connector and for this purpose each of the side flanges forms a hook element 14 for engagement with a loop element 15. The loop element 15 may be mounted on a strap end (not shown) and has a straight transverse portion 15a to engage both of the two hook elements 14 simultaneously and with equal pressure. Each of the hook elements 14 has a rearward shoulder 16 for engagement with the loop element 15, this shoulder being inclined slightly rearwardly. Each of the hook elements 14 is further shaped with a tapered forward shoulder 18 which leads to a short upright shoulder 20 adjacent the outer end of the hook element.

The two side flanges 12 of the body B further form a corresponding pair of rearwardly extending yoke arms 22 which are of divergent configuration as shown in FIG. 1 and are suitably adapted for releasable attachment to the end of a strap. In the construction shown the two yoke arms 22 are provided in a well-known manner with a fixed cross pin 24 and an adjacent slide pin 25.

The fixed cross pin 24 has reduced portions 26 at its opposite ends that are of hexagonal cross section and extend through corresponding apertures of the same configuration in the yoke arms. The outer ends of the fixed cross pin 24 are peened or riveted to the yoke arms 22 as indicated at 28.

Figure 2:
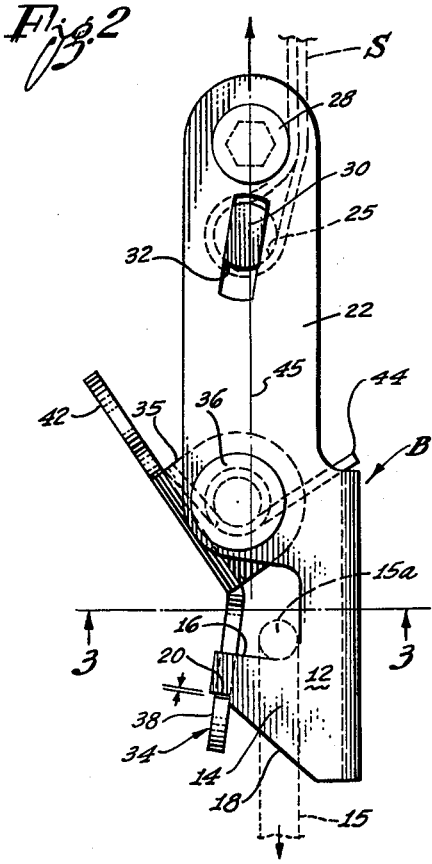
FIG. 2 is a side elevation of the strap connector.
Figure 3:
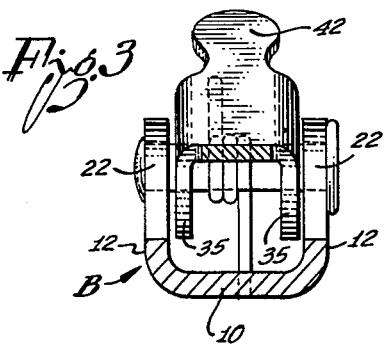
FIG. 3 is a transverse section taken as indicated by the line 3—3 of FIG. 2.
Figure 4:
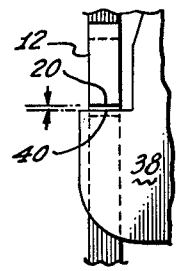
FIG. 4 is an enlarged fragment of FIG. 1 showing how a shoulder of the retainer extends across the path of yield of an associated hook element.

The slide pin 25 has flattened end portions 30 which are slidingly mounted in corresponding slots 32 in the two yoke arms 22 respectively. Dotted lines in FIG. 2 show how a strap, generally designated S, may be looped around the slide pin 25 in such a manner that the tension load on the strap causes the strap to be gripped between the slide pin and the fixed cross pin 24.

In accord with the teachings of the invention, the hook connector includes a reinforcing retainer member 34 in the form of a lever that is pivotally mounted on the body B. In the construction shown the retainer member is an angular metal plate formed with a pair of ears 35 that extend between the two side flanges 12 of the body B. A suitable pivot means or pintle 36 for hingedly mounting the retainer member 34 on the connector body extends through apertures in the two ears 35 and corresponding apertures in the two side flanges 12.

The forward arm of the retainer member 34 is in the form of a flat tongue 38 that extends between the two hook elements 14 and is formed with lateral shoulders 40 that extend across the upright shoulders 20 of the two hook elements 14 respectively. The lateral shoulders 40 are close enough to the upright shoulders 20 to lie across the path of yield of the two hook elements, i.e., the paths along which the two hook elements 14 yield in response to the load applied by the companion loop element 15.

The second rearwardly extending arm of the retainer member 34 is a flat inclined tongue 42 which serves as a handle or thumb piece for rocking the retainer member from its normal closed position to its open position. Suitable means such as a torque spring 44 acts under stress between the retainer member 34 and the connector body B to urge the retainer member toward its normal closed position that is shown in FIGS. 1 and 2.

The manner in which the invention serves its purpose may be readily understood from the foregoing description. By way of example, let it be assumed that the two hook elements 14 will deflect 0.080 inch under a given load of 1000 pounds without retainer 38. With such a load in mind, the lateral shoulders 40 of the retainer member 34 may have a clearance relative to the upright shoulders 20 of the two hook elements 14 of 0.020 inch when the two hook elements are not carrying a load. When the load is imposed on the two hook elements 14, the two hook elements initially deflect 0.020 inch in response to the applied load and then with the forward upright shoulders 20 of the 2 hook elements abutting the lateral shoulders 40 of the retainer member 34 a portion of the imposed load is transmitted to the retainer member, thereby reducing the applied stress on hook elements 14.

For example, 600 pounds of a 1600 pound load may be carried by the retainer member 34 with the remaining 1000 pounds of the load carried by the two hook elements 14. In the absence of retaining member 34 with its hooking means 40 the full 1600 pound load would be imposed on the hook elements 14 and with this load exceeding the elastic limits of the hook elements the two hook elements would be permanently deformed or would fail in bending.

One advantage of the described construction is that the retainer element 34 and the pintle 36 are substantially in alignment with each other and in alignment with the imposed load on retainer 34 permitting it to assume its applied load without bending stresses applied.

It is also to be noted in FIG. 2 that the two upright shoulders 20 of the two hook elements 14 respectively are inclined rearward to permit full freedom for lifting of the retainer member to its open position out of engagement with the two hook elements. In other words, the two upright shoulders 20 are inclined rearward from a line that is perpendicular to a radius from the axle of the pintle 36 to the upright shoulders. It is a simple matter to depress the handle 42 of the retainer member 34 to rock the retainer member to its open position to permit the loop element 15 to engage the two hook elements 14. At the destination of the aircraft it is just as simple to depress the handle portion 42 to permit the loop element 15 to be disengaged from the two hook elements 14.

Figure 5:
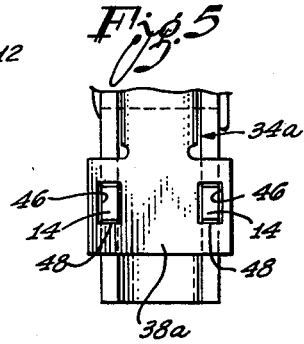
FIG. 5 is a fragmentary plan view showing a modified form of the retainer.

FIG. 5 indicates the construction of a reinforcing retainer member 34a that may be substituted for the above-described reinforcing retainer member 34. The retainer member 34a is of the previously described construction except that the forward tongue 38a of the retainer member is relatively wide and is formed with a pair of rectangular apertures 46 to receive the ends of the hook element 14. Thus the forward edges 48 of the apertures 46 function as lateral shoulders across the path of yield of the two hook elements 14 in the same manner as the lateral shoulders 40 of the first-described retainer member. The retainer member 34a may be regarded as having loops in the form of the rectangular apertures 46 to engage the two hook elements 14, whereas the first-described retainer member 34 may be regarded as having hooks in the form of the lateral shoulders 40 to engage the hook elements 14.

My description in specific detail of the selected embodiments of the invention will suggest various changes, substitutions and other departures from my disclosure within the spirit and scope of the appended claims.

I claim:

1. A strap connector for releasable engagement with a companion loop element, comprising: a connector body adapted for attachment to a strap; a pair of hook elements rigidly united with said body and spaced transversely thereof for engagement with said loop element at transversely spaced points thereof, said hook elements extending outward in a given lateral direction relative to the connector body, said hook elements having a range of load-responsive flexure within their elastic limits; means united with said body rearward of said hook elements and projecting in said given lateral direction; pivot means carried by said projecting means; and a retainer member mounted on said pivot means to swing relative to the hook elements in a plane of rotation lying between the two hook elements between an open position outward from the hook elements and a closed position, at which closed position it extends between the hook elements and blocks disengagement of the loop element from the hook elements, said retainer member being biased to seek its closed position and at its closed position having a portion blocking the path of load-responsive flexural yield of the hook elements within said range to engage the hook elements when the hook elements are heavily loaded thereby to share the load imposed on the hook elements.

2. A strap connector as set forth in claim 1 in which a portion of said retainer member extends rearward of said pivot means to serve as a handle for swinging the retainer member to open position.

3. A strap connector as set forth in claim 1 in which said retainer member is apertured to surround said hook elements.

4. A strap connector as set forth in claim 1 in which said retainer member has a pair of apertures to receive and surround said hook elements respectively.

5. A strap connector for releasable engagement with a companion loop element, comprising: a connector body having a central longitudinal web with a pair of forward opposite side flanges shaped to serve as hook elements and with a rearward pair of opposite side flanges, said hook elements having a range of load-responsive flexure within their elastic limits said rearward flanges having aligned apertures and having portions extending rearward from the aligned apertures; attachment means on said rearward portions for attachment to a strap; a pivot means extending through said aligned apertures; a retainer member mounted on said pivot means to swing about the axis thereof between an open position swung outward from the hook elements and a closed position, at which closed position it extends between the hook elements and blocks disengagement of the loop element from the hook elements, said retainer member at its closed position having a portion blocking the path of load-responsive flexural yield of the hook elements within said range to engage the hook elements when the hook elements are heavily loaded thereby to share the load imposed on the hook elements; and spring means acting between said connector body and said retainer member to urge the retainer member toward its closed position.

6. A strap connector as set forth in claim 5 in which said hook elements, said pivot means and said attachment means are in a common plane substantially parallel with said longitudinal web.

7. A strap connector as set forth in claim 5 in which said retainer member extends forward between said hook elements.

References Cited in the file of this patent

UNITED STATES PATENTS

| | | |
|---|---|---|
| 1,449,364 | McGowan | Mar. 20, 1923 |
| 1,458,453 | Young | June 12, 1923 |
| 1,466,615 | Falstrault | Aug. 28, 1923 |
| 1,688,176 | Clark | Oct. 16, 1928 |
| 1,716,997 | Antoniow | June 11, 1929 |
| 2,597,096 | Harris | May 20, 1952 |
| 2,857,644 | Gale | Oct. 28, 1958 |
| 2,896,288 | Davis | Jan. 28, 1959 |

FOREIGN PATENTS

| | | |
|---|---|---|
| 210,302 | Germany | May 26, 1909 |